(12) United States Patent
Van Der Brug

(10) Patent No.: US 10,506,692 B2
(45) Date of Patent: Dec. 10, 2019

(54) AUTOMATIC GRID MAPPING THROUGH TIMING

(71) Applicant: SIGNIFY HOLDING B.V., Eindhoven (NL)

(72) Inventor: Willem Peter Van Der Brug, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 15/758,898

(22) PCT Filed: Sep. 8, 2016

(86) PCT No.: PCT/EP2016/071199
§ 371 (c)(1),
(2) Date: Mar. 9, 2018

(87) PCT Pub. No.: WO2017/042283
PCT Pub. Date: Mar. 16, 2017

(65) Prior Publication Data
US 2019/0045608 A1 Feb. 7, 2019

(30) Foreign Application Priority Data

Sep. 11, 2015 (EP) .................................... 15184889

(51) Int. Cl.
*H04J 3/02* (2006.01)
*H05B 37/02* (2006.01)
(Continued)

(52) U.S. Cl.
CPC ......... *H05B 37/0281* (2013.01); *G08C 17/00* (2013.01); *H04L 67/12* (2013.01);
(Continued)

(58) Field of Classification Search
CPC . H05B 37/0281; H05B 37/0272; H04L 67/12; H04Q 1/28; H04Q 2213/13178
See application file for complete search history.

(56) References Cited

U.S. PATENT DOCUMENTS 8,265,674 B2 9/2012 Choong et al.
2001/0014832 A1* 8/2001 Hatemata ........... H05B 37/0281
700/16

(Continued)

FOREIGN PATENT DOCUMENTS

WO 2013024460 A2 2/2013
WO 2014060897 A1 4/2014

*Primary Examiner* — Munear T Akki
(74) *Attorney, Agent, or Firm* — Daniel J. Piotrowski

(57) ABSTRACT

For automated commissioning for automatic grid mapping, load devices comprising a load and detection devices have the detection devices (1) communicate with management devices (2) and comprise detectors (11) for detecting switchings of loads (3), timers (12) for determining and storing timings of the switchings of the loads (3) and transmitters (12) for transmitting information to the management devices (2). This information defines the timings of the switchings of the loads (3) as well as identifications of the detection devices (1), of the loads (3), and/or of load devices (201-220) comprising the detection devices (1) and the loads (3). The timings of the switchings of the loads (3) may define moments in time. By switching different groups of loads (3) at different moments in time, the different groups can be distinguished from each other. The management devices (2) comprise receivers (21) configured to receive the information from the detection devices (1) and may further comprise controllers (22) for controlling the switchings of the loads (3) to take place at different moments in time.

10 Claims, 4 Drawing Sheets

(51) Int. Cl.
*G08C 17/00* (2006.01)
*H04L 29/08* (2006.01)
*H04Q 1/28* (2006.01)

(52) U.S. Cl.
CPC ............ *H04Q 1/28* (2013.01); *H05B 37/0272* (2013.01); *G08C 2201/50* (2013.01); *H04Q 2213/13178* (2013.01)

(56) References Cited

U.S. PATENT DOCUMENTS

| | | | |
|---|---|---|---|
| 2002/0154652 A1* | 10/2002 | Yoshimura | H05B 37/0263 370/442 |
| 2006/0250027 A1* | 11/2006 | Pasma | G08B 15/002 307/140 |
| 2007/0085699 A1* | 4/2007 | Walters | G06Q 30/04 340/870.02 |
| 2008/0275573 A1 | 11/2008 | Shimba et al. | |
| 2012/0274234 A1* | 11/2012 | Campbell | H05B 37/0245 315/294 |
| 2014/0028216 A1* | 1/2014 | Wang | H05B 37/0245 315/294 |
| 2014/0340190 A1* | 11/2014 | Setomoto | G08C 17/02 340/3.1 |
| 2015/0084547 A1* | 3/2015 | Yeh | H04L 12/2807 315/312 |
| 2015/0366039 A1* | 12/2015 | Noori | H05B 37/0272 315/307 |
| 2016/0255687 A1* | 9/2016 | Zhang | H05B 33/0818 315/210 |
| 2017/0251540 A1* | 8/2017 | Van Der Brug | H05B 37/0254 |
| 2017/0347430 A1* | 11/2017 | Murakami | H05B 37/0218 |

\* cited by examiner

AUTOMATIC GRID MAPPING THROUGH TIMING

CROSS-REFERENCE TO PRIOR APPLICATIONS

This application is the U.S. National Phase application under 35 U.S.C. § 371 of International Application No. PCT/EP2016/071199, filed on Sep. 8, 2016 which claims the benefit of European Patent Application No. 15184889.2 filed on Sep. 11, 2015. These applications are hereby incorporated by reference herein.

FIELD OF THE INVENTION

The invention relates to a load device configured to comprise a detection device and a load. The invention further relates to a load device comprising a detection device configured to communicate with a management device, to a management device configured to distinguish groups of load devices from each other, to a system, to a method, to a computer program product and to a medium. Examples of such a load device are lamps, like for example street-lamps. Examples of such a management device are non-load devices, like for example data processing devices. Examples of such a system are automatic grid mapping systems.

BACKGROUND OF THE INVENTION

US 2014/0340190 A1 discloses a wireless control system, wherein different wall-switches control different ceiling-lamps. Each ceiling-lamp has a timer for measuring an amount of elapsed time from a moment of switching on the ceiling-lamp via its wall-switch. One of the ceiling-lamps can become a master, and the other ones then become slaves that upon reception of identifications from the master and therefore upon request from the master send their amounts of elapsed time to the master. By comparing the amounts of elapsed time of the slaves, the master can determine which slaves belong to the same wall-switch as the master.

SUMMARY OF THE INVENTION

It is an object of the invention to provide a load device comprising a load and a detection device configured to communicate with a management device. It is a further object of the invention to provide a management device configured to distinguish groups of load devices from each other, to provide a system, to provide a method, to provide a computer program product and to provide a medium.

According to a first aspect, a load device is provided comprising a load and a detection device, wherein the detection device is configured to communicate with a management device and comprises:
  a detector configured to detect a switching of a load,
  a timer configured to determine and store a timing of the switching of the load, and
  a transmitter configured to transmit information to the management device, which information defines the timing of the switching of the load as well as an identification.

A load device comprising a load and a detection device is configured to communicate with a management device, such as for example a data processing device. The detection device comprises a detector configured to detect a switching of a load, such as for example a lamp, such as a switch-on off the load or a switch-off of the load. The detection device comprises a timer configured to determine a timing of the switching of the load. The detection device further comprises a transmitter configured to transmit information to the management device. This information defines the timing of the switching of the load as well as an identification. As a result, a load device comprising a load and a detection device has been created that can report the switching of a particular load coupled to the load device in an autonomous way to a management device, without request and response signals needing to be exchanged between the management device and the load device, and without any identification needing to be sent from the management device to the load device in advance. This is a great technical advantage.

The system disclosed in US 2014/0340190 A1 is different from the present invention. The master and the slaves in US 2014/0340190 A1 are all load devices, whereas in the present invention a management device is described which is not a load device. Moreover, the system described in the present invention comprises several groups of detection devices and a management device while the system described in the prior art is a system wherein one of the loads must become a master and wherein the other loads must become slaves.

The system that comprises several groups of load devices and a management device does further not require addresses to be assigned by the management device to the load devices.

A detection device configured to communicate with a management device for example monitors the switching of a load and informs the management device about this switching. A detector for detecting the switching of the load for example detects a presence or an absence of a supply signal for supplying the load. A timer for determining a timing of the switching of the load for example determines a time or a time-interval in an absolute way or a relative way and expressed in units of time or in numbers of pulses or in any other way. A transmitter for transmitting information to a management device may be a wireless transmitter or a wired transmitter. The information defines the timing of the switching of the load as well as an identification of the load or of the detection device or of a load device comprising both. The identification may be an absolute identification or a relative identification and may for example comprise a code or may for example be defined by a frequency or a wave-length of the transmission etc.

An embodiment of the load device is defined, wherein the timing of the switching of the load defines a moment in time of the switching of the load. Preferably, the timing defines a moment in time of the switching of the load. By switching different groups of loads at different moments in time, the different groups can be distinguished from each other.

An embodiment of the load device is defined, wherein the moment in time of the switching of the load is defined by a particular moment in time or by a length of a time-interval configured to extract the particular moment in time. According to a first option, the moment in time of the switching of the load is defined by a particular moment in time. In this case, the management device is well informed of the switching of the load, even when different transmissions of information to the management device are delayed in a manner different from one another. According to a second option, the moment in time of the switching of the load is defined by a length of a time-interval configured to extract the particular moment in time. In this case, the management device is well informed of the switching of the load, as long as different transmissions of information to the management device are not delayed relatively differently.

An embodiment of the load device is defined, wherein the timer is configured to determine the timing of the switching of the load at the hand of a clock signal, wherein the detection device comprises a generator configured to generate the clock signal. A generator for generating a clock signal may comprise a calculator or a converter that derives the clock signal from satellite signals such as for example global-positioning-system signals or from other signals arriving through air or through cable or may comprise a clock producer that produces the clock signal and that has an in-built power supply or another power provision such that a generation can be relatively continuous.

An embodiment of the load device is defined, wherein the switching of the load comprises a switch-on of the load, and wherein the timer is configured to determine a length of a time-interval present between a moment in time of the switch-on of the load and an availability of a clock signal. According to a first option, a switching of the load comprises a switch-on of the load. In that case, the timer should determine a length of a time-interval present between a moment in time of the switch-on of the load and an availability of a clock signal. From the length of a time-interval and the availability of the clock signal, the particular moment in time of the switch-on can be calculated, and can be transmitted to the management device, to allow the management device to distinguish between different groups of loads that have been switched-on at different moments in time.

A detection device is defined, wherein the switching of the load comprises a switch-off of the load, and wherein, as mentioned before, the timer is configured to store a moment in time of the switch-off. According to a second option, a switching of the load comprises a switch-off of the load, whereby usually the detection device will be switched-off as well, owing to the fact that usually the detection device and the load will form part of a load device that is switched-off in its entirety. In that case, the timer should be configured to store a moment in time of the switch-off. After the load has been switched-on again, the moment in time of the switch-off can be transmitted to the management device, to allow the management device to distinguish between different groups of loads that have been switched-off at different moments in time. A storage of the moment in time of the switch-off should preferably be a storage that requires no power.

As mentioned before, a load device is provided configured to comprise the detection device, wherein the load device further comprises the load.

According to a third aspect, a management device is provided configured to distinguish groups of load devices as defined above from each other, wherein the management device comprises:

a receiver configured to receive the information from the detection devices. The management device distinguishes the groups of load devices from each other at the hand of the information received from these load devices. A receiver for receiving the information from the load devices may be a wireless receiver or a wired receiver.

An embodiment of the management device is defined, wherein the management device further comprises:

a controller configured to control the switching of the loads, wherein a first switching of first loads in a first group is configured to take place at a first moment in time, and wherein a first switching of second loads in a second group is configured to take place at a second moment in time different from the first moment in time.

By switching different groups of loads at different moments in time, the different groups can be distinguished from each other. The first and second moments in time may for example differ by 10 seconds, without having excluded other differences.

An embodiment of the management device is defined, wherein a first switching of third loads in a third group is configured to take place at the first moment in time, and wherein a first switching of fourth loads in a fourth group is configured to take place at the second moment in time, wherein a second switching of the first loads in the first group and a second switching of the second loads in the second group is configured to take place at a third moment in time different from the first and second moments in time, and wherein a second switching of the third loads in the third group and a second switching of the fourth loads in the fourth group is configured to take place at a fourth moment in time different from the first, second and third moments in time.

By firstly switching first and third groups of loads at a same moment in time and by firstly switching second and fourth groups of loads at another same moment in time and by secondly switching the first and second groups of loads at a same moment in time and by secondly switching the third and fourth groups of loads at another same moment in time, a total number of required different moments in time can stay relatively small. The third and fourth moments in time may for example differ by 10 seconds, whereby the first and third moments in time may differ by ca. 24 hours, and whereby the second and fourth moments in time may differ by ca. 24 hours, without having excluded other differences.

According to a fourth aspect, a system is provided configured to comprise several groups of load devices each one as defined above and configured to comprise a management device as defined above, which system is configured to map the several groups of load devices at the hand of the information transmitted from each one of the load devices to the management device.

An embodiment of the system is defined, wherein the system further comprises a network coupled to the groups of load devices and to the management device.

According to a fifth aspect, a method is provided configured to distinguish groups of load devices as defined above from each other, wherein the method comprises a step of:

receiving the information from the load devices.

According to a sixth aspect, a computer program product is provided for performing the step of the method as defined above.

According to a seventh aspect, a medium is provided for storing and comprising the computer program product as defined above.

A basic idea is that a switching of a load is to be detected, a timing of the switching of the load is to be determined, and information defining the timing of the switching of the load as well as an identification is to be transmitted to a management device, to allow different groups of loads to be distinguished.

A problem to provide a load device comprising a load and a detection device has been solved. A further advantage is that automated commissioning has become possible at a reduced complexity.

These and other aspects of the invention will be apparent from and elucidated with reference to the embodiments described hereinafter.

DETAILED DESCRIPTION OF EMBODIMENTS

Figure 1:
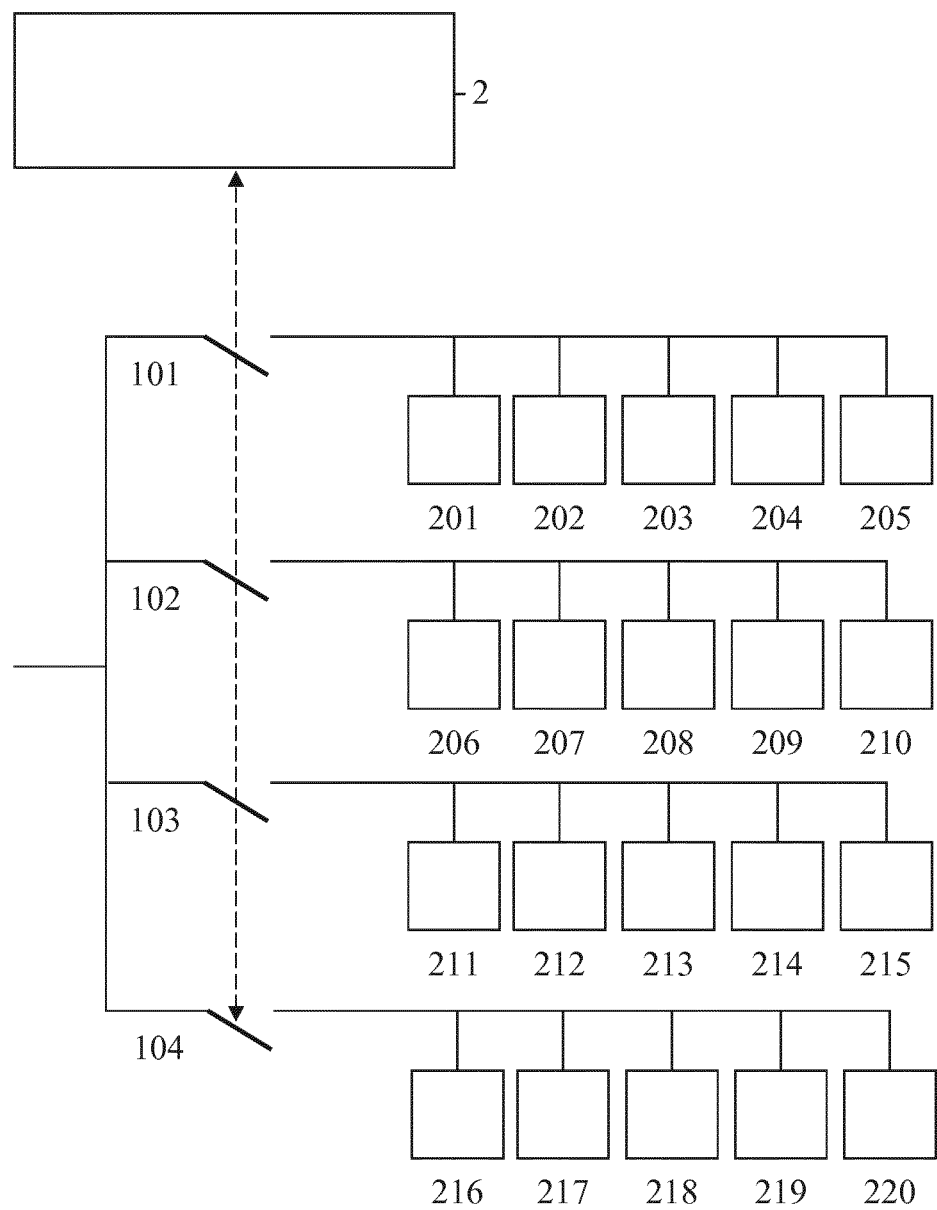
FIG. 1 shows an embodiment of a system.

In the FIG. 1, an embodiment of a system is shown. The system comprises a first (second, third, fourth) group of load devices 201-205 (206-210, 211-215, 216-220) coupled via a first (second, third, fourth) cable to a first side of a first (second, third, fourth) switch 101 (102, 103, 104). The other sides of the switches 101-104 are coupled to each other and to a power supply not shown all via a fifth cable for feeding the load devices 201-220. The system further comprises a management device 2 that in a minimum situation may be informed about the conducting and non-conducting states of the switches 101-104 and that in an extended situation may control the switches 101-104. In the FIG. 1, the cables are indicated as single lines comprising single conductors, whereby a return path may for example be realized through an earth connection not shown, but alternatively, these cables may comprise two conductors or more, as shown in the FIGS. 2 and 3.

For maintenance and diagnostics in general, and for asset management of streetlamps in particular, it is valuable to know a relationship between street cabinets, relays and load devices (street-lamps), and between an electricity grid and the load devices (street-lamps). Sometimes, that relationship has got lost fully or partially. It is not known anymore exactly which load device is connected to which specific phase of which specific cable, or it is even unknown to which transformer a (group of) load devices has been connected. There may be dozens of street cabinets each one comprising dozens of relays. And even in case the grid information is available in documentation, market feedback has proven that automated commissioning has more value than non-automated (manual) commissioning.

Figure 2:
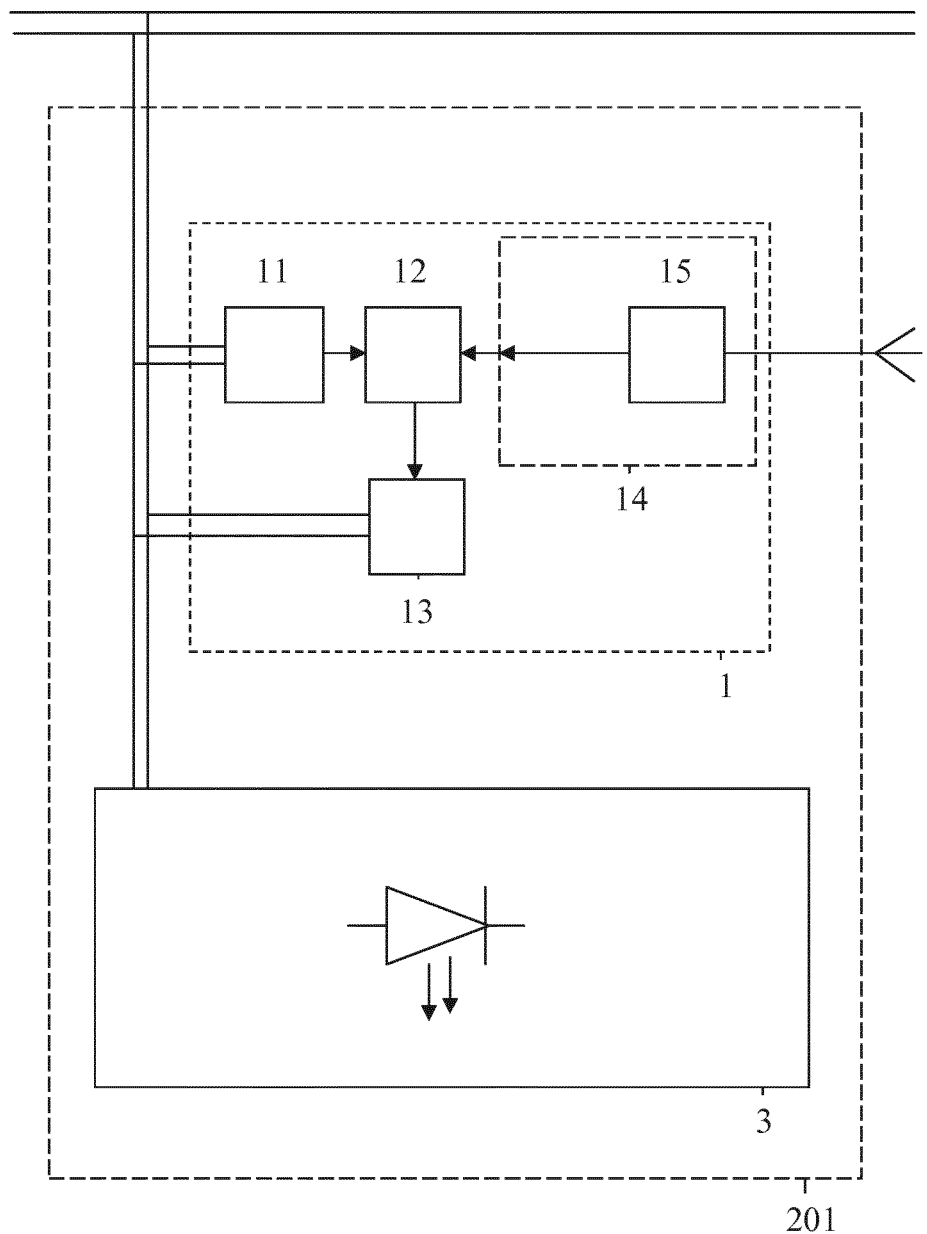
FIG. 2 shows a first embodiment of a detection device in a load device.

In the FIG. 2, a first embodiment of a detection device in a load device is shown, i.e. a load device comprising a load and a detection device. The load device 201 comprises a load 3 coupled to the first cable, and further comprises the detection device 1. The detection device 1 comprises a detector 11 coupled to the first cable and configured to detect a switching of the load 3, here by detecting a presence or an absence of a supply signal on the first cable. The detection device 1 further comprises a timer 12 coupled to the detector 11 and configured to determine a timing of the switching of the load 3. The detection device 1 further comprises a transmitter 13 coupled to the timer 12 to receive information from the timer 12. This transmitter 13 is further coupled to the first cable and configured to transmit the information to the management device 2, here via the first cable. This information defines the timing of the switching of the load 3 as well as an identification of the detection device 1, of the load 3 and/or of the load device 201.

The timing of the switching of the load 3 may define a moment in time of the switching of the load 3. By switching different groups of loads 3 at different moments in time, the different groups can be distinguished from each other. Preferably, the moment in time of the switching of the load 3 is defined by a particular moment in time or by a length of a time-interval configured to extract the particular moment in time. So, the moment in time of the switching of the load 3 may be defined by a particular moment in time. In that case, the management device 2 is well informed of the switching of the load 3, even when different transmissions of information to the management device are delayed relatively differently. Alternatively, the moment in time of the switching of the load 3 may be defined by a length of a time-interval configured to extract the particular moment in time. In that case, the management device 2 is well informed of the switching of the load 3, as long as different transmissions of information to the management device 3 are not delayed too differently.

The timer 12 may be configured to determine the timing of the switching of the load 3 at the hand of a clock signal, wherein the detection device 1 may further comprise a generator 14 configured to generate the clock signal and to provide it to the timer 12. Here, the generator 14 comprises a calculator 15 or a converter 15 that derives the clock signal from satellite signals or from other signals arriving through air or through cable. Here, the calculator 15 or the converter 15 is coupled to an antenna, alternatively it could be coupled to the first cable or to another cable.

The switching of the load 3 may comprise a switch-on of the load 3, in which case the timer 12 should be configured to determine a length of a time-interval present between a moment in time of the switch-on of the load 3 and an availability of the clock signal. From the length of the time-interval and the availability of the clock signal, the particular moment in time of the switch-on can be calculated, and can be transmitted to the management device 2, to allow the management device 2 to distinguish between different groups of loads 3 that have been switched-on at different moments in time.

The switching of the load 3 may alternatively comprise a switch-off of the load 3, in which case the timer 12, as mentioned before, is configured to store a moment in time of the switch-off. Usually the detection device 1 will be switched-off in combination with the load 3, owing to the fact that usually the detection device 1 and the load 3 form part of a load device 201 that is switched-off in its entirety. The timer 12 stores the moment in time of the switch-off. After the load 3 (the detection device 1, the load device 201) has been switched-on again, the moment in time of the switch-off can be transmitted to the management device 2, to allow the management device 2 to distinguish between different groups of loads 3 that have been switched-off at different moments in time. A storage of the moment in time of the switch-off should preferably be a storage that requires no power such as for example a non-volatile memory.

Figure 3:
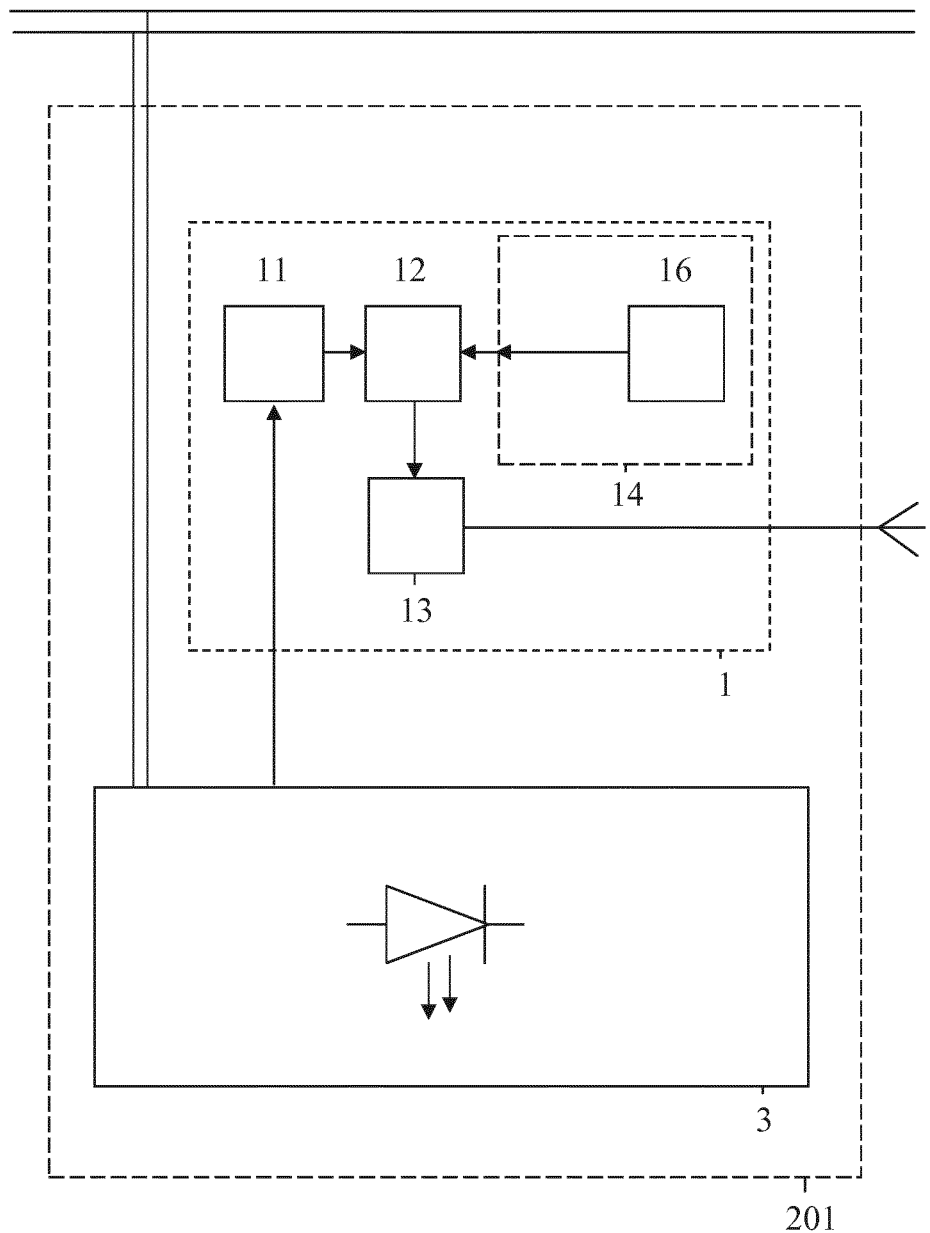
FIG. 3 shows a second embodiment of a detection device in a load device.

In the FIG. 3, a second embodiment of a detection device in a load device is shown, i.e. a load device comprising a load and a detection device. This second embodiment differs from the first embodiment shown in the FIG. 2 in that the detector 11 is no longer coupled to the first cable but is coupled to the load 3 to be able to detect a switching of the load 3, here via a report signal provided by the load 3. The second embodiment also differs from the first embodiment shown in the FIG. 2 in that the transmitter 13 is no longer coupled to the first cable but is coupled to an antenna for transmitting the information to the management device 2, here through air. Finally, the second embodiment also differs from the first embodiment shown in the FIG. 2 in that the generator 14 comprises a clock producer 16 that produces the clock signal and that has an in-built power supply or another power provision for guaranteeing a relatively continuous generation of the clock signal. Parts of the FIG. 2 and parts of the FIG. 3 may be combined into a new embodiment.

Preferably, the detector 11 is a detector of a kind that is most of the time switched-off and that is switched-on only to detect. Such a detector may for example use the supply signal to do the detection. Further, for example in case a relatively precise clock signal is to be derived from satellite signals or from other signals arriving through air or through cable, an availability of the relatively precise clock signal may take some time. The timer can however start timing immediately after the detection, without the relatively precise clock signal being available immediately, by using another less precise clock signal, that is available immediately.

Figure 4:
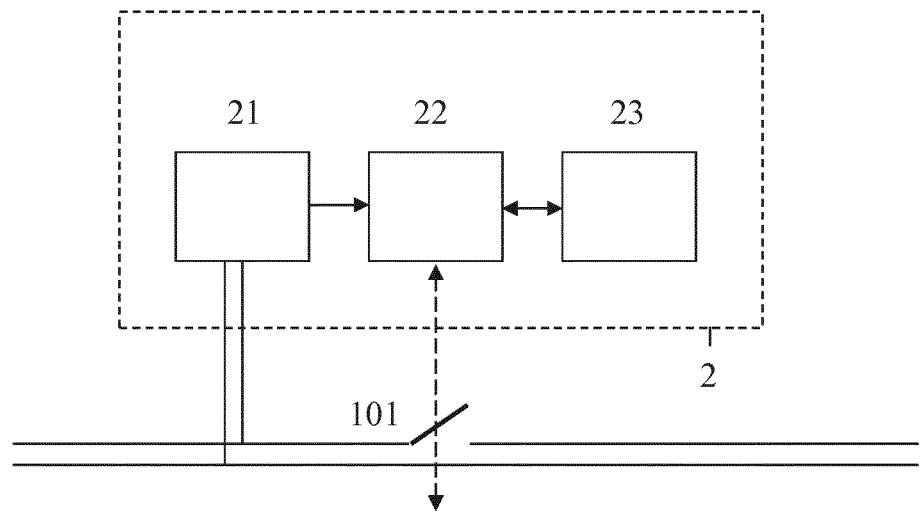
FIG. 4 shows a first embodiment of a management device.

In the FIG. 4, a first embodiment of a management device is shown. This management device 2 could be used in combination with the load device 201 shown in the FIG. 2 and comprises a receiver 21 coupled to the fifth cable and configured to receive the information from the detection devices 1, here via the first and fifth cables. Alternatively, the receiver 21 could be coupled to the first cable to avoid the switch 101 being involved. The management device 2 further comprises a controller 22 coupled to the receiver 21 and to a man-machine-interface 23. In a minimum situation, the controller 22 is informed about the conducting and non-conducting states of the switches 101-104 such that the controller 22 can distinguish the several groups shown in the FIG. 1 as discussed below. In this case, the switches 101-104 are controlled by an entity not shown. In a more extended situation the controller 22 may control the switches 101-104. Via the man-machine-interface 23, data about the conducting and non-conducting states of the switches 101-104 can be entered and results about a configuration of a network comprising the cables can be displayed.

Figure 5:
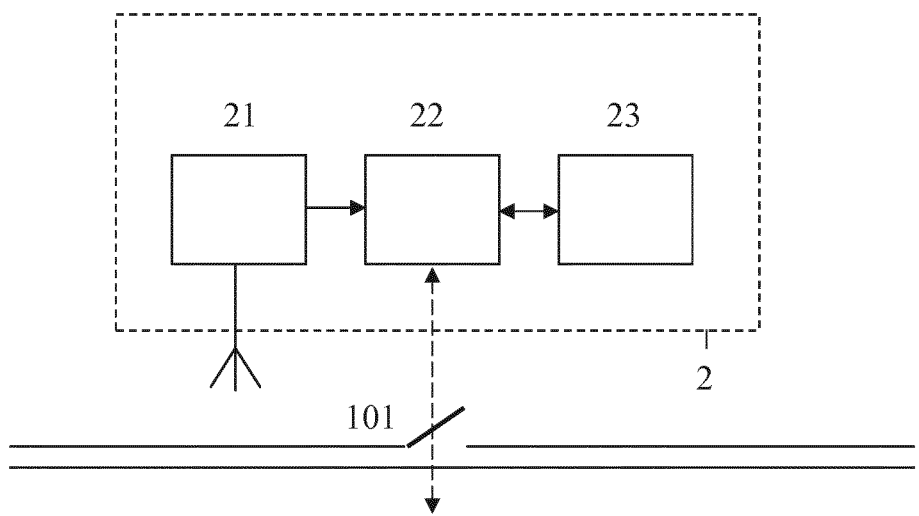
FIG. 5 shows a second embodiment of a management device.

In the FIG. 5, a second embodiment of a management device 2 is shown. This management device 2 could be used in combination with the load device 201 shown in the FIG. 3. The second embodiment differs from the first embodiment shown in the FIG. 4 in that the receiver 21 is coupled to an antenna to receive the information from the detection devices 1, here through air.

Preferably, the controller 22 is configured to control the switching of the loads 3, wherein a first switching of first loads 3 in a first group is configured to take place at a first moment in time, and wherein a first switching of second loads 3 in a second group is configured to take place at a second moment in time different from the first moment in time. Then, after each detection device 1 in each load device 3 has sent the information to the management device 2, it will be clear which load devices 201-205 are switched via the first switch 101 and which load devices 206-210 are switched via the second switch 102. This is a first aspect of the configuration of the network that can be found. A second aspect of the configuration of the network that can be found could be the individual positions of the load devices 201-210, for example in case the calculator 15 or the converter 15 comprises a global-positioning-system device or another positioning device. The information to be transmitted to the management device 2 may further comprise positioning data defining the individual position. This positioning data may partly or fully coincide with the identification, or not.

In case of four different groups of load devices 201-220 being present, as shown in the FIG. 1, four different moments of switching are to be introduced for the four switches 101-104. But possibly, there might be more than one hundred different switches each one for switching an arbitrary number of load devices. In that case, it is advantageous if each load device can determine the moment in time of the switching of its load very accurately such that small differences in time between the different moments of switching can be introduced. This could limit the user-unfriendliness, for example in case the loads 3 comprise streetlamps positioned at relatively small distances from each other. However, still, more than one hundred different moments of switching need to be introduced, which could be relatively user-unfriendly, for example in case the loads 3 comprise streetlamps positioned at relatively large distances from each other. To avoid this situation, the following could be done, as explained for the system shown in the FIG. 1.

Further preferably, a first switching of third loads 3 in a third group is configured to take place at the first moment in time, and a first switching of fourth loads 3 in a fourth group is configured to take place at the second moment in time, wherein the first and second moments in time are as discussed before. Further, a second switching of the first loads 3 in the first group and a second switching of the second loads 3 in the second group is configured to take place at a third moment in time different from the first and second moments in time, and a second switching of the third loads 3 in the third group and a second switching of the fourth loads 3 in the fourth group is configured to take place at a fourth moment in time different from the first, second and third moments in time. The first and second moments in time may for example differ by 10 seconds, and the third and fourth moments in time may for example also differ by 10 seconds, while being situated 24 hours after the first and second moments in time. This way, per day there will be only two different moments of switching. After 7 days, $2^7=128$ possibilities can be covered. This means that in a network configuration with 128 switches after one week it can be clear which load devices are switched by which switches. Each group will have a unique combination of moments of switching, and as a result each group can be distinguished from each other group, and can thus be identified. This way, automatic grid mapping has been done through controlling the timing of the switches. Of course, only those groups can be distinguished from each other where each group is switched by its own switch.

So, the system shown in the FIG. 1 is configured to comprise several groups of load devices 201 comprising a load 3 and a detection device 1 and is configured to comprise a management device 2 and is configured to map the several groups of load devices 1 at the hand of the information transmitted from each one of the detection devices 1 to the management device 2. Such a system may further comprises a network coupled to the groups of load devices 1 possibly via the loads 3 and to the management device 2, through wire of through air.

The particular moments in time, the lengths of the time-intervals configured to extract the particular moment in times and other parts of the information may be exchanged in a coded way or in a non-coded way. Each transmission can be any kind of transmission and each reception can be any kind of reception, including light. The detection device 1 communicates with the management device 2 by transmitting the information to the management device 2. Further communications are not to be excluded, such as a transmission of other information from the detection device 1 to the management device 2, for example for other information purposes. The detection device 1 may be located relatively close to the load 3, inside or outside the load device 201, and may be located relatively close to the switch 101 (at the side of the switch 101 that is connected to the load device 201) or anywhere in between. The cables shown in the FIGS. 1, 2 and 3 are firstly used for supplying power to the load devices 201-220 and may secondly be used for communication, without having excluded other kinds of communications. First and second elements can be coupled indirectly via a third element and can be coupled directly without the third element being in between.

Summarizing, for automated commissioning for automatic grid mapping, detection devices 1 communicate with management devices 2 and comprise detectors 11 for detecting switchings of loads 3, timers 12 for determining timings of the switchings of the loads 3 and transmitters 12 for transmitting information to the management devices 2. This information defines the timings of the switchings of the loads 3 as well as identifications of the detection devices 1, of the loads 3, and/or of load devices 201-220 comprising the detection devices 1 and the loads 3. The timings of the switchings of the loads 3 may define moments in time. By switching different groups of loads 3 at different moments in time, the different groups can be distinguished from each other. The management devices 2 comprise receivers 21 configured to receive the information from the detection devices 1 and may further comprise controllers 22 for controlling the switchings of the loads 3 to take place at different moments in time.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A system configured to comprise a management device and several groups of load devices, wherein:
    each load device comprising a load and a detection device, wherein the detection device is configured to communicate with a management device and wherein the detection device comprises:
      a detector configured to detect an on and an off switching of the load,
      a timer configured to determine and store a timing of the switching of the load, and
      a transmitter configured to transmit information to the management device, which information defines the timing of the switching of the load as well as an identification;
    the management device configured to distinguish the several groups of load devices from each other, wherein the management device comprises
      a receiver configured to receive the information from the several load devices, and
      a controller configured to control the switching of loads of the several groups of load devices, wherein a first switching of first loads in a first group is configured to take place at a first moment in time, and wherein a first switching of second loads in a second group is configured to take place at a second moment in time different from the first moment in time;
    wherein the system is configured to commission the several groups of load devices based on the first and second moments in time and the information transmitted from each one of the several load devices to the management device.

2. The system as defined in claim 1, wherein the timing of the switching of the load defines a moment in time of the switching of the load.

3. The system as defined in claim 2, wherein the moment in time of the switching of the load is defined by a particular moment in time or by a length of a time-interval configured to extract the particular moment in time.

4. The system as defined in claim 1, wherein the timer is configured to determine the timing of the switching of the load using a clock signal, wherein the detection device comprises a generator configured to generate the clock signal.

5. The system as defined in claim 1, wherein the switching of the load comprises a switch-on of the load, and wherein the timer is configured to determine a length of a time-interval present between a moment in time of the switch-on of the load and an availability of a clock signal.

6. The system as defined in claim 1, wherein the switching of the load comprises a switch-off of the load, and wherein the timer is configured to store a moment in time of the switch-off.

7. The system as defined in claim 1, wherein the transmitter is a wireless transmitter.

8. The system as defined in claim 1, wherein a first switching of third loads in a third group is configured to take place at the first moment in time, and wherein a first switching of fourth loads in a fourth group is configured to take place at the second moment in time, wherein a second switching of the first loads in the first group and a second switching of the second loads in the second group is configured to take place at a third moment in time different from the first and second moments in time, and wherein a second switching of the third loads in the third group and a second switching of the fourth loads in the fourth group is configured to take place at a fourth moment in time different from the first, second and third moments in time.

9. The system as defined in claim 1, wherein the system further comprises a network coupled to the groups of load devices and to the management device.

10. The system as defined in claim 1, wherein each load device is a street-lamp.

\* \* \* \* \*